UNITED STATES PATENT OFFICE.

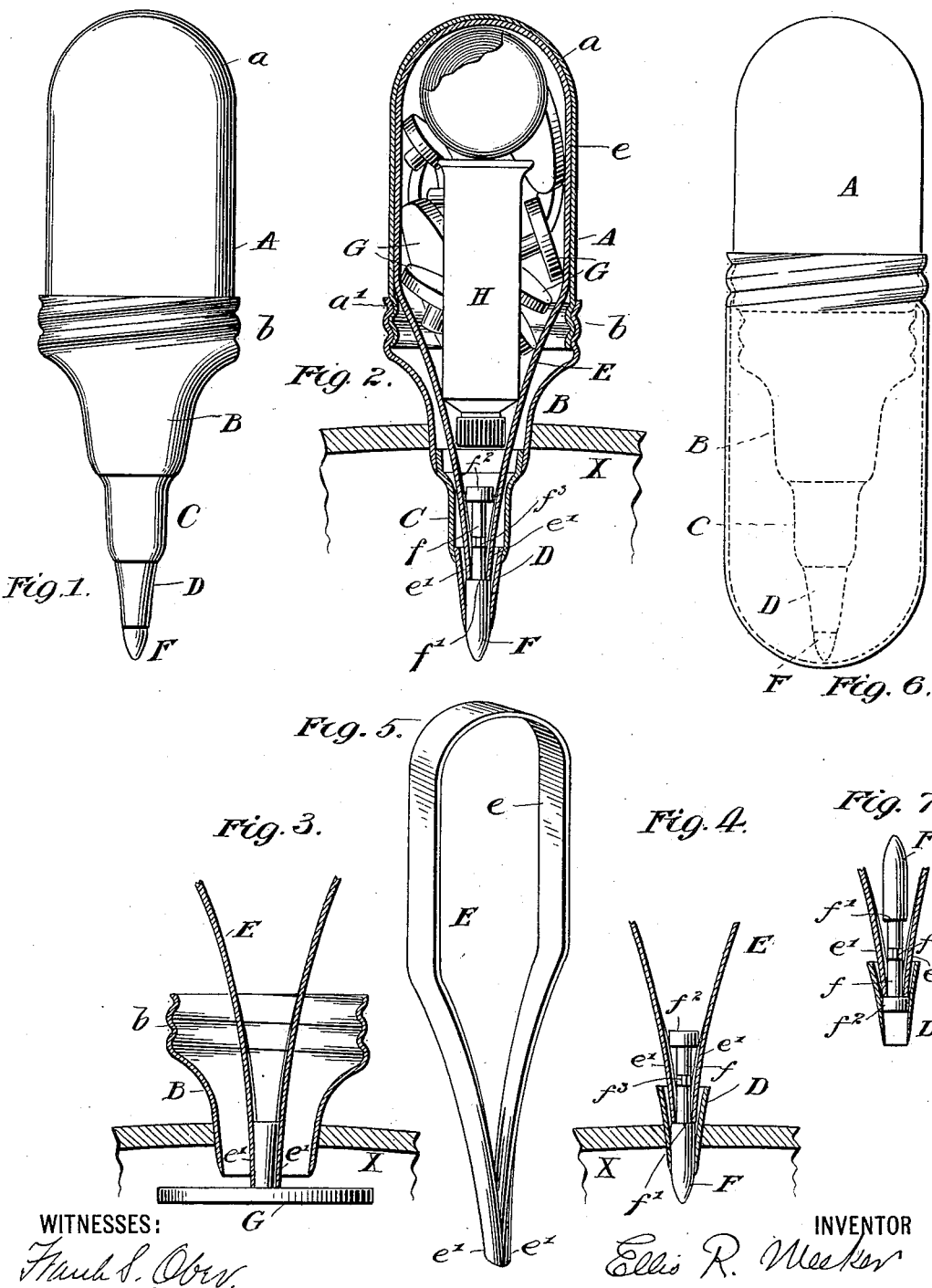

ELLIS R. MEEKER, OF ELIZABETH, NEW JERSEY, ASSIGNOR TO THE AMERICAN KIT COMPANY, OF NEW YORK, N. Y.

TOOL FOR REPAIRING PNEUMATIC TIRES.

SPECIFICATION forming part of Letters Patent No. 611,972, dated October 4, 1898.

Application filed February 24, 1897. Serial No. 624,840. (No model.)

*To all whom it may concern:*

Be it known that I, ELLIS R. MEEKER, a citizen of the United States, residing at Elizabeth, in the county of Union and State of New Jersey, have invented certain new and useful Improvements in Tools for Repairing Pneumatic Tires, of which the following is a specification.

Single-tube pneumatic tires, as well as the tubes of double or inner tube pneumatic tires, are usually repaired by plugs having large disks or patches on their ends which are cemented to the inside of the tube over a puncture, cut, or other like injury. To repair pneumatic tires in this way, special tools adapted for the purpose, particularly when a puncture occurs on the road, have heretofore been devised.

The improved tool herein described differs, so far as I am aware, from all others before invented.

The object of my invention is to furnish a tool adapted to repair punctures or cuts of various sizes by the use of patches of suitable sizes and in which an assortment of patches, a tube or package of cement, and all requisite parts shall be contained within the device.

To this end I have devised a special tool having a probe to enter the punctures and make an entrance for ferrules or tubes of different sizes to occupy the punctures while the patches are being inserted, pincers for holding and inserting the probe, patches and a body or shell forming the handle in which are carried the cement and plugs, the pincers also being contained within the ferrules and handle and forming an interior frame therefor.

In the accompanying drawings, Figure 1 is an elevation of my improved repairing-tool closed and in condition for being carried in the pocket or tool-kit of the rider. Fig. 2 is a sectional view of a part of a pneumatic tire and a longitudinal section through the tool and shows also an assortment of patching-plugs and a cement-tube contained in the sheal or handle. Fig. 3 shows in section a part of a pneumatic tire, one of the guiding-ferrules forming part of the tool, and the lower end of the pincers grasping a patching-plug within the tire. Fig. 4 shows the probe and the smallest ferrule held by the pincers and passed through a pneumatic tire. Fig. 5 is a perspective view of the pincers. Fig. 6 is a view similar to Fig. 1, showing a protecting-cover placed over the ferrule end of the instrument, thus adding to the holding capacity of the instrument; and Fig. 7 shows the manner in which the smallest ferrule is held by the pincers when used as a cutter.

The main body portion A of the casing is preferably circular in cross-section, one end being rounded or semispherical at $a$ to fit the palm of the hand and afford a convenient handle for operating the tool in the manner hereinafter described. At its opposite end the casing or body portion is screw-threaded at $a'$ to receive the screw-threaded end $b$ of a guiding-ferrule B. This guiding-ferrule is tapered or funnel-shaped, and at its lower end it receives the end of a second smaller funnel-shaped ferrule C, which in turn is in like manner connected with a third funnel-shaped ferrule D. The ferrules are thus nested together, each joint being such that the ferrules cannot be pulled out of the nest in a direction downward, as indicated in Fig. 2; but those marked B and C may be pushed forwardly and removed when desired. The casing and the ferrules may all be struck up or spun from sheet metal.

The pincers E are preferably shaped as shown in Fig. 5, the upper part $e$ conforming to the inside of the casing A and fitting it neatly, as shown in Fig. 2. When thus inserted, the tendency is to close the jaws $e'$ of the pincers; but when the pincers are removed from the casing the jaws automatically open, but they may be readily closed by the grasp of the user.

The opening in the end of the ferrule D, which is formed to have the function of a circular cutter, is closed by a probe F, as shown at Figs. 1, 2, and 4, and which may be withdrawn from the ferrule D. This probe has a long shank $f$, a head $f^2$ at the other end, and lateral projections $f^3$ at about the center of the shank which is grasped by the jaws of the pincers when the tool is closed and in condition for being carried in the pocket or in the kit of the rider and also when the rider uses the tool to find a puncture and to ascertain its size. The manner of using the probe will be hereinafter explained.

An assortment of patching-plugs G and a small tube of cement H may be carried in the casing A. The probe F is shouldered at $f'$, and the ends of the pincers bear against this shoulder when the parts are assembled, as shown in Figs. 2 and 4. The jaws of the pincers are concaved longitudinally at $e^2$ to fit the shank $f$ of the probe. When the parts are assembled, the tool on the inside will appear as in Fig. 2 and on the outside as in Figs. 1 and 6, all of the parts being rigid, inasmuch as pincers fit tightly in the casing A and against the shoulder of the probe F, which projects beyond the end of the ferrule D; but as the head $f^2$ bears against the jaws of the pincers it cannot be withdrawn, so that by this construction as soon as the ferrule B is screwed onto the casing A the parts are locked rigidly together and form a smooth convenient article that takes up but little room in the pocket or in the kit of a rider and contains in itself all the parts requisite for repairing all kinds of punctures or cuts in a tire.

If a small puncture is to be repaired, the probe will open the way for the entrance of the ferrule D, which may be passed through the puncture by pressing on the casing or handle A. If the puncture or cut is somewhat larger, the probe and the ferrule D are passed entirely through the puncture and the ferrule C is passed part way through the puncture, or for a larger puncture the tool may be inserted until the ferrule B occupies the puncture or cut, as shown at Figs. 2 and 3. When it is found, for instance, that the ferrule B tightly fits the puncture and that the tube is expanded as much as need be, the case or handle A is detached therefrom. The probe and the pincers, as well as the ferrules C and D, are then withdrawn. A suitable-sized plug having then been selected and inserted in the jaws of the pincers, the pincers are again inserted in the handle A. Then the plug should be covered with cement in the usual way and passed down through the ferrule B, as indicated in Fig. 3, the ferrule B acting as a guide and furnishing a smooth surface, which enables the disk or head of the plug to pass into the tube X, where it expands or flattens out, as indicated in Fig. 3. When thus inserted, the ferrule may be withdrawn and the disk or patch of the plug drawn up tightly against the inside of the tube or tire X, the shank or stem of the patch being pulled outward and held long enough to allow the cement to set. The plug of the patch is then disengaged from the pincers and is trimmed down on the outside flush with the face of the tire.

Of course the tool may be used otherwise than as above described. Thus if the ferrule C is of sufficient size the larger one B may be removed before the insertion of ferrule C into the puncture, and after its insertion the probe and ferrule D may be withdrawn, as already stated.

The parts may readily be reassembled, it being desirable first to insert the probe in the pincers, then place the small ferrule D in place, then pass the ferrule C over the ferrule D, and the ferrule B over C. Then the pincers, cement-tube, and plugs may be inserted in the casing and the parts screwed together. The tool works efficiently, is not apt to get out of order, and may be cheaply and conveniently carried.

When the ferrule D is to be used as a cutter, it is placed over the head $f^2$ of the probe, which snugly fits in the interior of D, said probe being firmly held by the pincers E, the jaws of which embrace the shank of the probe with their ends against the inner side of the head $f^2$. The lateral projections $f^3$ project through the open sides of the jaws of the pincers, insure the rotation of the probe with the pincers, and act as a stop for the cutter-ferrule D, the inner end of which rests against them and prevents the cutter-ferrule from being jammed too tightly over the head $f^2$ and the jaws of the pincers.

I claim as my invention—

1. A tire repair-tool comprising a handle and a nest of guiding-ferrules tapering from the handle, the larger end of the larger ferrule being detachably connected to the handle, and the ferrules being nested so as to telescope one within another in a direction toward the handle, but held against separation in the opposite direction, substantially as and for the purpose set forth.

2. A tire repair-tool comprising a casing forming a handle closed at its outer end and open at its inner end, a probe, and a nest of guiding-ferrules located between the probe and the handle, tapering from the handle outwardly to the probe and the larger end of the larger ferrule being detachably connected with the open end of the handle and closing the same, substantially as set forth.

3. A tire repair-tool comprising a casing, a probe, pincers arranged within the casing and connected with the probe, and a nest of ferrules arranged around the pincers, detachably connected with the casing and tapering from the casing to the probe.

4. A tire repair-tool comprising a casing for containing patching-plugs and a tube or package of cement, a nest of funnel-shaped guiding-ferrules detachably connected with each other and detachably connected with the casing, a probe, and pincers connected with the probe and arranged within the ferrules and casing.

5. A tire repair-tool comprising a hollow handle, a pair of pincers fitting in the handle and having spring-jaws that are drawn together when the pincers are seated in the handle, a pin grasped by the pincers and nesting ferrules arranged around the pincers, detachably connected with the handle and tapering from the handle to the pin.

6. A tire repair-tool comprising a hollow handle serving as a receptacle, a nest of guiding-ferrules connected with the handle and telescoping inwardly toward the handle, but held against separation in the opposite direction, a point or probe at the end of the nest of ferrules, and a pair of pincers grasping the probe or point within the handle and ferrules.

7. A tire repair-tool comprising a hollow handle serving as a receptacle, a nest of guiding-ferrules connected with the handle and telescoping inwardly toward the handle, but held against separation in the opposite direction, a point or probe at the end of the nest of ferrules, a pair of pincers grasping the probe or point, within the handle and ferrules, the pincers being expansible when removed from the handle and contracted to grasp the probe or plug when reseated in the handle.

8. A tire repair-tool comprising a casing, a nest of guiding-ferrules, the outer or smaller one of which is formed with a cutting edge on its end, a probe, and pincers arranged within the casing and ferrules and connected with the probe.

9. In a tire repair-tool, the combination of a probe having a point at one end and a head at the other, pincers adapted to hold the probe with its point or head extending from the end, and a circular cutter-ferrule formed to fit over the head of the ferrule with its cutting edge free and to fit over the point of ferrule with its point projecting beyond so as to protect the cutting edge of the ferrule.

10. In a tire repair-tool, the combination of a probe having a point at one end and a head at the other, and lateral projections between the point and the head, pincers adapted to hold the probe with its point or head extending from the end and the lateral projections extending through the side openings of the jaws, and a circular cutter-ferrule formed to fit over the head of the ferrule with its cutting edge free with its end resting against the lateral projections of the ferrule, and to fit over the point of ferrule with its point projecting beyond so as to protect the cutting edge of the ferrule.

In testimony whereof I have hereunto subscribed my name.

ELLIS R. MEEKER.

Witnesses:
  ANDW. J. PROVOST,
  EDWARD C. DAVIDSON.